United States Patent
Weiss

[11] Patent Number: 5,427,477
[45] Date of Patent: Jun. 27, 1995

[54] TOOL FOR CALIBRATING AND DEBURRING PIPE ENDS

[75] Inventor: Paul Weiss, Ch-Jona, Switzerland

[73] Assignee: Geberit Technik AG, Jona, Switzerland

[21] Appl. No.: 238,502

[22] Filed: May 5, 1994

[30] Foreign Application Priority Data

May 14, 1993 [CH] Switzerland .................. 1474/93

[51] Int. Cl.6 .................. B23B 35/00; B23B 51/02
[52] U.S. Cl. .................. 408/1 R; 408/224
[58] Field of Search .......... 7/157; 82/113; 408/223, 408/224, 225, 1 R, 80, 81, 82, 201

[56] References Cited

U.S. PATENT DOCUMENTS

| 499,098 | 6/1893 | Comstock | 408/224 |
| 2,343,824 | 3/1944 | Wachowitz | 408/201 |
| 2,374,552 | 4/1945 | Marini | 408/201 |
| 2,865,237 | 12/1958 | Degenhart | 408/201 |
| 3,645,640 | 2/1972 | Zukes | |
| 4,582,458 | 4/1986 | Korb et al. | 408/224 |

FOREIGN PATENT DOCUMENTS

| 0006434 | 1/1980 | European Pat. Off. | |
| 1080865 | 12/1954 | France | 408/223 |
| 2231464 | 12/1974 | France | |
| A2634679 | 2/1980 | France | |
| A2518187 | 11/1976 | Germany | |
| 16912 | 1/1988 | Japan | 408/223 |
| 155004 | 12/1920 | United Kingdom | 408/223 |
| 2142864 | 1/1985 | United Kingdom | 408/82 |

OTHER PUBLICATIONS

Microtecnic 1975, No. 3, pp. 13-14.

*Primary Examiner*—Daniel W. Howell
*Attorney, Agent, or Firm*—McGlew and Tuttle

[57] ABSTRACT

A tool provided with a head tapering stepwise toward a front side. Each step of the head has a cylindrical area for calibrating a pipe end and, joining it, a conical area for deburring the pipe end. Each step of the head corresponds to a usual pipe size. When the head is pushed into a pipe end to be processed, the pipe end is first calibrated and subsequently deburred in one operation. The pipe end is centered in relation to the longitudinal axis of the head due to the calibration at the cylindrical area, which guarantees accurate deburring at the conical area. Each conical area has a plurality of cutting edges, which are formed by chip grooves. The tool is especially suitable for preparing pressed connections on composite pipes.

12 Claims, 2 Drawing Sheets

TOOL FOR CALIBRATING AND DEBURRING PIPE ENDS

FIELD OF THE INVENTION

The present invention pertains to a tool for calibrating and deburring pipe ends, with at least one cylindrical area for calibrating and a conical area for deburring.

BACKGROUND OF THE INVENTION

To prepare a high-quality connection between a fitting and an end of a composite pipe, the end of the composite pipe to be connected also must be calibrated if it is noncircular. Calibration is necessary especially because the pipe end is usually deformed during the cutting off of the pipe. A tool of the above-described class has hitherto been used for this purpose. This has, on a holder, a burr for deburring and a plurality of pins with a cylindrical area, corresponding to the usual pipe sizes, for calibration. Using this tool, the pipe end to be connected was deburred on the inside with the burr and calibrated on the calibrating pin corresponding to this pipe end after the composite pipe had been cut by means of a pipe cutter. The pipe thus prepared was subsequently pushed over the fitting and pressed with a jointing clamp. The calibration and deburring are essentially installation steps for preparing tight pressed connections, which have proved to be extremely successful especially in interior installations.

SUMMARY AND OBJECTS OF THE INVENTION

The primary object of the present invention is to provide a tool of the above-mentioned type, with which the installation steps described can be performed even more simply and yet with high-quality results.

The object is attained with a tool of this type by the two areas being arranged on one head one behind the other, such that when the head is introduced into a pipe end to be processed, the cylindrical area can first be brought into contact with the pipe end, and the conical area can be brought into contact thereafter.

Thus, the calibrating pin and the deburring cone in the tool according to the present invention are not arranged separately on a holder, but one behind the other on one head. This offers the essential advantage that it is not necessary to switch over to the deburring cone after the calibration, but the calibrating and deburring can be performed in one operation by turning the head into the pipe end to be connected. Since the pipe end is centered by the cylindrical area in relation to the head during deburring, tilting of the pipe during deburring is avoided. This ensures that the depth of deburring along the inner edge of the pipe is always exactly defined and uniform. Consequently, simpler, more rapid, and yet clean preparation of pipe ends for the installation of fitting connections of high quality is achieved with the tool according to the present invention. If the tool has radially arranged chip grooves according to a variant of the present invention, it is ensured that the chips removed from the pipe during deburring are removed to the outside instead of entering the pipe. Chips remaining in the pipe in a pressed connection are thus prevented from making the pressed connection untight.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3b is a view similar to FIG. 3a;

DETAILED DESCRIPTION OF THE PREFERRED EMBODIMENTS

Figure 1:
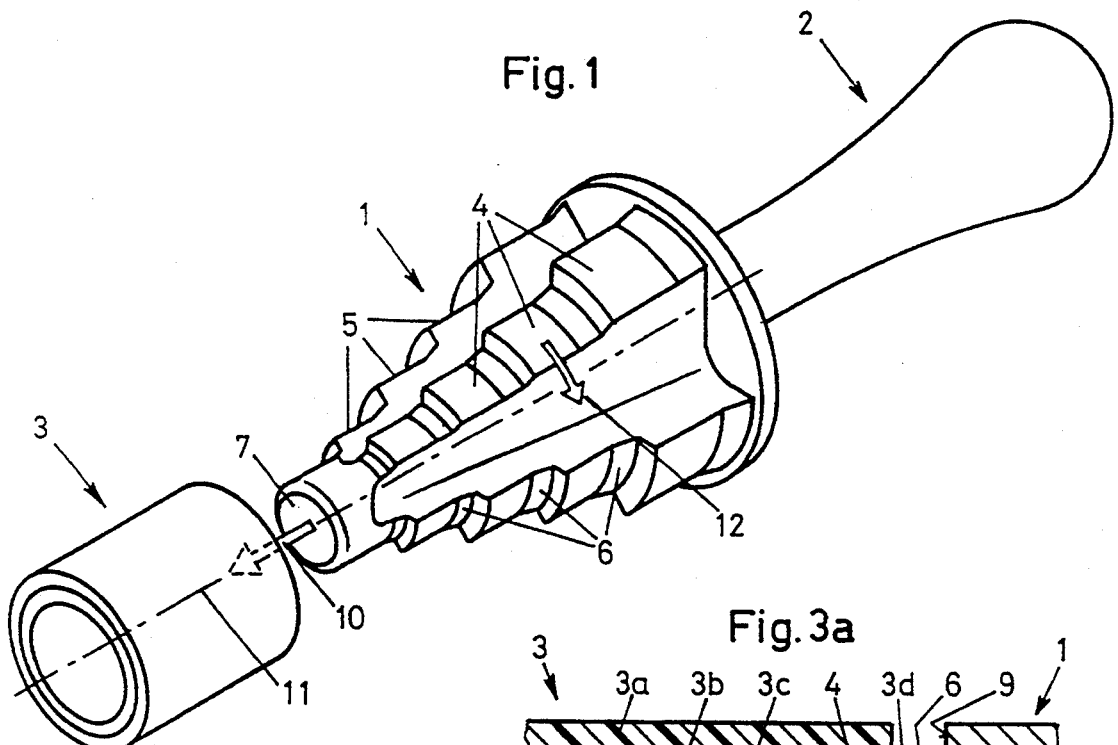
FIG. 1 is a perspective view of a tool according to the present invention and of a pipe end to be processed.
Figure 2:
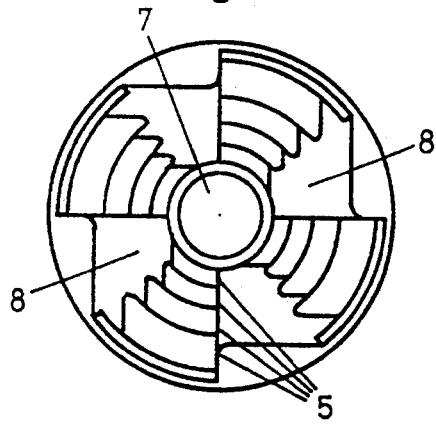
FIG. 2 is a front view of the tool according to claim 1.
Figure 4:
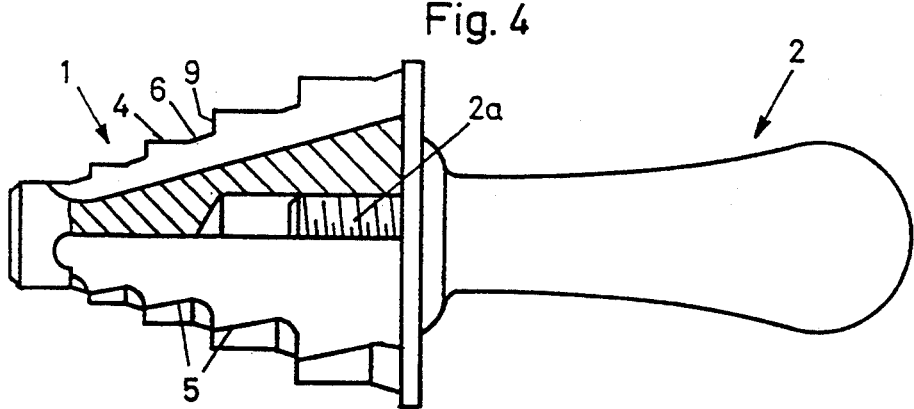
FIG. 4 is a partial longitudinal sectional view through the tool according to the present invention.

According to FIG. 1, the tool has a handle 2, onto which a head 1 tapering stepwise toward the front stirface 7 is screwed. To fasten the head 1 detachably to the handle 2, the handle 2 has, according to FIG. 4, a threaded pin 2a, which is screwed into a threaded hole 1a of the head 1. The head 1 is preferably made in one piece, e.g., as a metal casting.

Figure 3A:
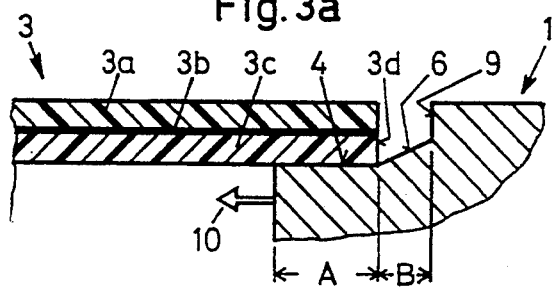
FIG. 3a is a longitudinal sectional view through part of the tool and a pipe end to explain the calibration and the deburring.

Four chip grooves 8, which are arranged rotationally symmetrically in relation to one another and extend in parallel to an axis of rotation 11 of the head, are worked into the outside of the head 1. A plurality of cylindrical areas or sections 4, whose diameters correspond to the usual internal diameters of pipes, extend between the chip grooves 8 in the circumferential direction of the head 1, coaxially to the axis 11. The cylindrical areas 4 are used to calibrate a pipe end 3. For calibration, the head 1 is turned into the pipe end 3 in the longitudinal direction in the direction of arrow 10 according to FIG. 1. The pipe end 3 is calibrated and aligned in relation to the axis 11 by the cylindrical area 4, which corresponds to the internal diameter of the pipe end 3. A noncircular pipe end 3 is thus plastically deformed and rounded by the cylindrical area 4. FIG. 3a shows a pipe end 3 pushed over a cylindrical area 4. The pipe end 3 is, e.g., the pipe end of a composite pipe, which has a middle layer 3b consisting of, e.g., aluminum, as well as an outer layer 3a and an inner layer 3c, each made of a suitable plastic. Such pipes are flexible and plastically deformable. The head 1 preferably has a plurality of such cylindrical areas 4, but a design in which only one such cylindrical area 4 is provided is also conceivable.

Figure 3B:
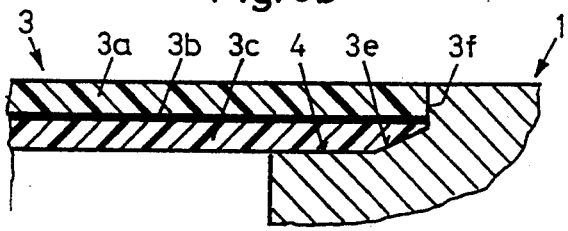

Each cylindrical area 4 is joined by a conical area 6 on the head 1 in the direction opposite the direction of the arrow 10, and the conical area 6 is also arranged coaxially to the axis 11 and is interrupted by the chip grooves 8. Each conical area 6 has four cutting edges 5, which are formed by the chip grooves 8. The conical areas 6 are used to debur an inner edge 3d of the pipe end 3. To do so, the head 1 is pushed farther into the pipe end 3 in the direction of the arrow 10, beyond the position shown in FIG. 3a and at the same time rotated by the handle 2 in the direction of the arrow 12. The four cutting edges 5 now plane off the edge 3d until the front side 3f of the pipe end 3 comes into contact with a shoulder 9 of the head 1. The edge 3d, planed off and deburred, now has the conical surface 3e shown in FIG. 3b. The depth of deburring corresponds to the length B of the conical area 6 shown in FIG. 3a. The length B is preferably substantially smaller than the length A of the cylindrical area 4. The centering of the pipe end 3 at the cylindrical area 4, as well as the stop at the shoulder 9 guarantee uniform deburring and a defined depth of deburring.

Figure 5:
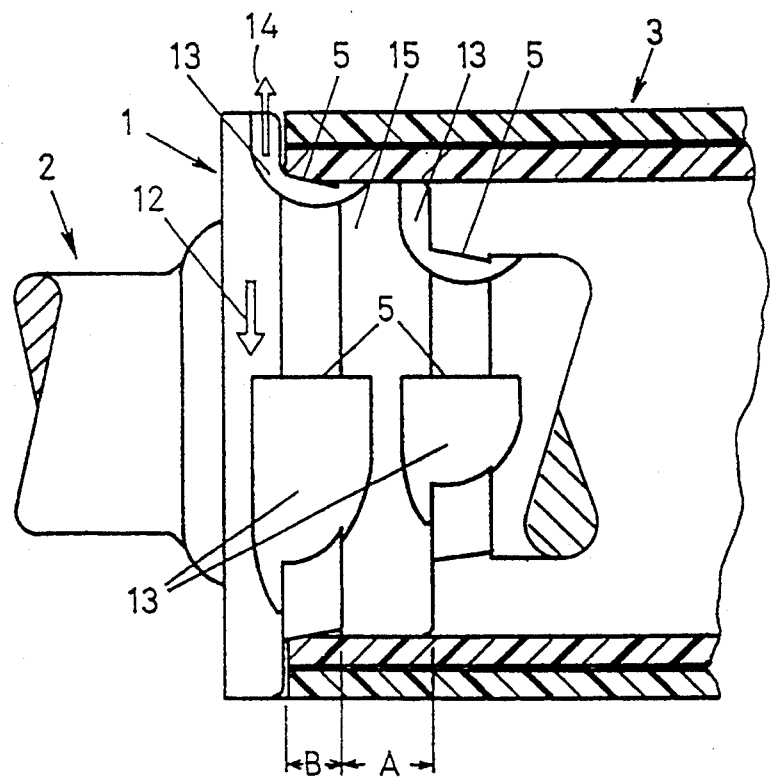
FIG. 5 is a partial view of a variant of the tool according to the present invention.
Figure 6:
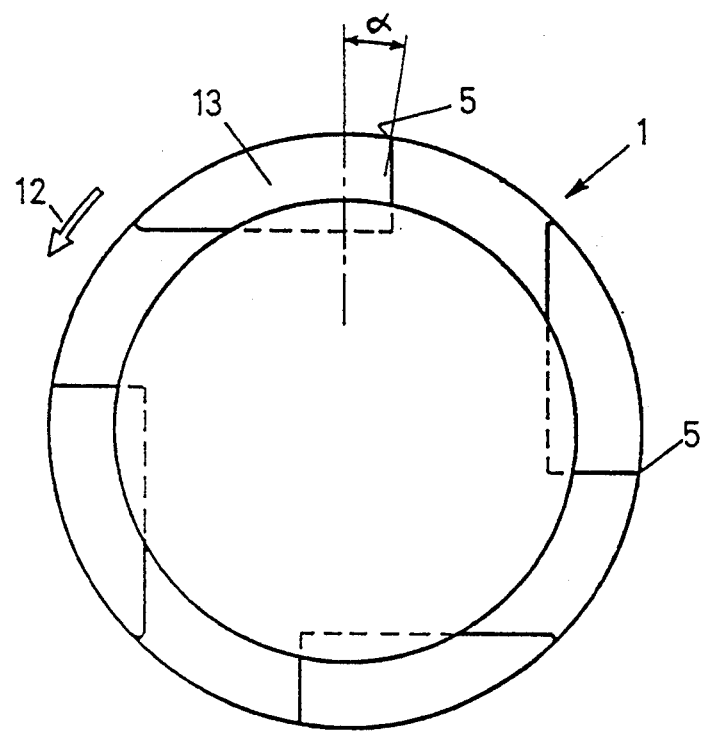
FIG. 6 is a partial view of the tool according to the variant shown in FIG. 5.

The variant of the tool 1 according to the present invention shown in FIGS. 5 and 6 differs from the above-described design in that radially arranged chip grooves 13, which extend in the circumferential direction, are worked into the outside of the head. The chips are removed to the outside through the chip grooves 13 during deburring, as is indicated by the arrow 14 in FIG. 5. A circumferential surface 15, which is in contact with the inside of the pipe 3, prevents chips from entering the pipe 3. The number of chip grooves 13 corresponds to the number of cutting edges 5, which are preferably arranged on the head according to FIG. 6 at a cutting angle α.

The tool is especially suitable for processing composite pipes with an inner layer of metal, but application in the case of simple plastic pipes is also conceivable. The tool is preferably a hand tool, but a design in which the head 1 is rotated by means of an electric motor is also conceivable.

While specific embodiments of the invention have been shown and described in detail to illustrate the application of the principles of the invention, it will be understood that the invention may be embodied otherwise without departing from such principles.

What is claimed is:

1. Tool for calibrating and deburring pipe ends, comprising: a single head including calibrating means with a cylindrical area for calibration and deburring means with a conical area for deburring, said conical area being disposed behind said cylindrical area to position said conical area with respect to said cylindrical area such that when said head is introduced into a pipe end to be processed, said cylindrical area can first be brought into contact with said pipe end and said conical area can subsequently be brought into contact with said pipe end; and a shoulder, connected to said conical area and extending radially outwardly therefrom, said shoulder forming a stop for engaging a front face of the pipe end to center said pipe end and to provide uniform deburring.

2. Tool according to claim 1, wherein said head includes a plurality of cylindrical areas, each cylindrical area having an associated said conical area, said plurality of cylindrical areas being provided with different diameters to form a stepped head for deburring a pipe of one of various different defined internal diameters.

3. Tool according to claim 1, wherein said conical area has at least one cutting edge formed adjacent to a chip groove.

4. Tool according to claim 2, wherein each of said conical areas include an associated cutting edge formed adjacent to a chip groove.

5. Tool in according to claim 3, wherein said chip groove extends into an outside of said head and extends in a circumferential direction of said head.

6. Tool in according to claim 4, wherein said chip groove extends into an outside of said head and extends in a circumferential direction of said head.

7. Tool according to claim 6, wherein a plurality of radially arranged chip grooves extend into said head for each conical area.

8. Tool according to claim 1, wherein said head has a broad end fastened to a handle.

9. A process for deburring composite pipes or plastic pipes for interior installation, comprising the steps of:
providing a tool with a head having a cylindrical area for calibration and a conical area for deburring, said conical area being arranged behind said cylindrical area and a shoulder connected to said conical area and extending radially outwardly therefrom, said shoulder forming a stop;
introducing said head into a pipe end to be processed including
first bringing said cylindrical area into contact with said pipe end; and
subsequently bringing said conical area into contact with said pipe end and deburring said pipe end with said conical area and subsequently engaging a front face of the pipe end with said stop to center said pipe end and to provide uniform deburring.

10. A process according to claim 9, wherein said tool is provided with a plurality of cylindrical areas, each of said cylindrical areas having a corresponding one of said conical areas, said cylindrical areas having different diameters to define a stepped head; and employing one of said cylindrical areas based on a diameter of one of said cylindrical areas corresponding to a defined pipe internal diameter.

11. Tool for calibrating and deburring pipe ends, comprising: a single head including calibration means with a cylindrical area for calibration and deburring means with a conical area for deburring, said cylindrical area including a cylindrical portion extending uninterrupted about said head, said conical area being disposed behind said cylindrical area such that when said head is introduced into a pipe end to be processed, said cylindrical area can first be brought into contact with said pipe end and said conical area can subsequently be brought into contact with said pipe end; a shoulder, connected to said conical area and extending radially outwardly therefrom, said shoulder forming a stop for engaging a front face of the pipe end to center said pipe end and to provide uniform deburring, said conical area including an associated cutting edge formed adjacent to chip groove means, said chip groove means including a chip groove extending into an outside of said head and being radially arranged adjacent to said uninterrupted cylindrical portion for removing chips of the pipe to an outside of the pipe, said uninterrupted cylindrical portion preventing said chips from entering the pipe.

12. Tool according to claim 11, wherein said head includes a plurality of cylindrical areas, each cylindrical area having an associated said conical area with said shoulder, said plurality of cylindrical areas being provided with different diameters to form a stepped head for deburring a pipe of one of various different defined internal diameters.

* * * * *